(12) United States Patent
Kodama

(10) Patent No.: US 7,221,848 B2
(45) Date of Patent: May 22, 2007

(54) DATA RECORDING AND REPRODUCING APPARATUS AND DATA RECORDING AND REPRODUCING METHOD

(75) Inventor: Yasumasa Kodama, Tokyo (JP)

(73) Assignee: Sony Corporation, Tokyo (JP)

( * ) Notice: Subject to any disclaimer, the term of this patent is extended or adjusted under 35 U.S.C. 154(b) by 1108 days.

(21) Appl. No.: 09/731,994

(22) Filed: Dec. 7, 2000

(65) Prior Publication Data

US 2001/0012442 A1 Aug. 9, 2001

(30) Foreign Application Priority Data

Dec. 8, 1999 (JP) ................................ 11-349090

(51) Int. Cl.
*H04N 5/91* (2006.01)
(52) U.S. Cl. .................. 386/46; 386/100; 386/125; 714/6
(58) Field of Classification Search ........ 386/125–126, 386/124, 100; 714/5, 6, 7
See application file for complete search history.

(56) References Cited

U.S. PATENT DOCUMENTS

| 4,761,785 A | * | 8/1988 | Clark et al. ................ 714/6 |
| 5,179,704 A | * | 1/1993 | Jibbe et al. ................ 710/262 |
| 5,195,100 A | * | 3/1993 | Katz et al. ................. 714/22 |
| 5,278,838 A | * | 1/1994 | Ng et al. ..................... 714/6 |
| 5,333,305 A | * | 7/1994 | Neufeld ....................... 714/5 |
| 5,758,057 A | * | 5/1998 | Baba et al. ................... 714/7 |
| 5,778,426 A | * | 7/1998 | DeKoning et al. .......... 711/122 |
| 5,923,817 A | | 7/1999 | Nakamura |
| 6,404,975 B1 | * | 6/2002 | Bopardikar et al. ........ 386/125 |

FOREIGN PATENT DOCUMENTS

| EP | 0 521 630 | 1/1993 |
| EP | 0 786 719 | 7/1997 |
| EP | 0 905 693 | 3/1999 |
| EP | 0 959 400 | 11/1999 |

\* cited by examiner

*Primary Examiner*—Vincent F. Boccio
(74) *Attorney, Agent, or Firm*—Frommer Lawrence & Haug LLP; William S. Frommer; Thomas F. Presson

(57) ABSTRACT

I/O processing sections for inputting and outputting AV data between themselves and the outside are connected to RAIDS through a network. Each I/O processing section includes an input processing section for distributing divided AV data inputted from the outside to two or more RAIDS and generating error-correcting codes of AV data for transferring it to at least one RAID, and an output processing section for correcting the AV data transferred from the RAID by using the error-correcting codes of the AV data transferred from the RAID to outputting the corrected data to the outside. With the function of correcting error in the network provided upstream, not only in the case of breakdown of the hard disk of RAIDS, but also in the case of breakdown of I/O processing upstream, outputting AV data without loss in reproduction can be performed, AV server is prevented from becoming larger in scale, and a load imposed on the network is prevented from increasing.

10 Claims, 9 Drawing Sheets

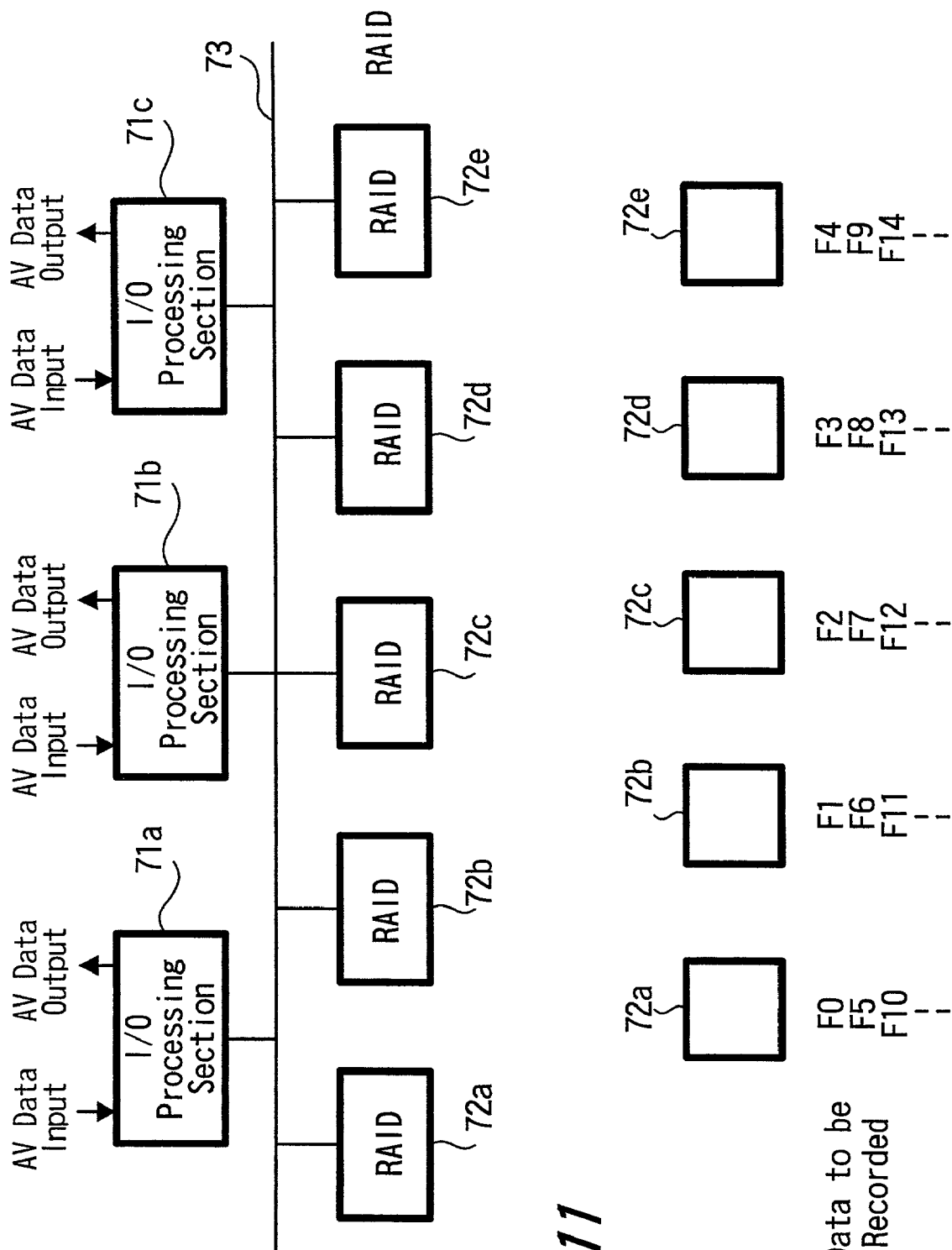

DATA RECORDING AND REPRODUCING APPARATUS AND DATA RECORDING AND REPRODUCING METHOD

BACKGROUND OF THE INVENTION

1. Field of the Invention

The present invention relates to a data recording and reproducing apparatus such as an AV server using a nonlinear accessible recording medium. The present invention relates also to a data recording and reproducing method for use in such data recording and reproducing apparatus.

2. Description of the Related Art

In recent years, as data are provided through multiple channels due to widespread CATV (cable television), etc. unlike a conventional VTR (video tape recorder), a demand for a variety of video tape recorder functions such as recording or reproducing a plurality of video/audio data (hereinafter referred to as "AV data") simultaneously, or reproducing a plurality of AV data while recording the same by a single AV data recording and reproducing apparatus is increasing. To meet with such demand, devices called video server (or also called AV (Audio and/or Video) server) capable of recording and reproducing image/voice using a recording medium such as a hard disk which enables random access are being spread.

In general, AV servers for use in broadcasting stations need to have a required high data transfer rate and have a large storage capacity to record data for a long time from demands for high picture quality and high sound quality. An attempt has hitherto been made in order to increase a data transfer rate and a storage capacity by using a plurality of hard disk (hereinafter referred to as an "HD") devices capable of storing AV data and processing in parallel. Further, another attempt has been made in order to keep servers highly reliable even if any of HD devices should break down by recording parity data.

This makes a multichannel AV server to be realized, which meets various uses such as constructing systems of VOD (video on demand) or NVOD (near video on demand), etc. by recording material data comprised of a plurality of AV data dispersedly for simultaneously transmitting them through multichannels or by reproducing the same material data through multichannels with staggered reproducing time, even though the number of required channels is different depending on contents of programs which the broadcasting station is to provide and the broadcasting format.

The HD devices for use in such AV server employ a RAID (Redundant Arrays of Inexpensive Disks) technique in which a plurality of hard disk drives (hereinafter referred to as "HDD") comprising a plurality of HDs are arranged, which was proposed on a paper ('A Case for Redundant Arrays of Inexpensive Disks (RAID)', ACM SIGMOND Conference, Chicago, III, Jun. 1–3, 1988) presented by Patterson et al. in 1988.

In the above paper, the RAID is classified into five types from RAID-1 to RAID-5. RAID-1 is a system to write the same contents into two HDDs. RAID-3 is a system in which input data is recorded in a plurality of HDDs after the data is divided by the fixed length, and parity data that is exclusive-OR of corresponding data blocks of each HDD is generated and written into another HDD. RAID-5 is a system which increases the data division unit (block) to record one divided data as a data block in one HDD, records results of taking exclusive-OR of corresponding data blocks of each HDD (parity data) as parity blocks in other HDDs and disperses parity blocks to other HDDs.

Refer to the above paper for other RAIDs.

To record/reproduce a plurality of AV data by this AV server simultaneously, a video/audio signal (hereinafter referred to as an "AV signal") has to be simultaneously inputted to and outputted through a plurality of channels. Therefore, the AV server includes a plurality of I/O ports which operate independently, and it is arranged that one input port and one output port inputs and outputs data for one channel, respectively.

However, when the respective I/O ports transfer AV data between them selves and a video recording and reproducing apparatus at the very same time, those AV data will simultaneously flow into buses connecting the respective I/O ports and the video recording and reproducing apparatus within the AV server, so that those data will be out of processing. Thus, time slots (=time intervals) for allowing the use of bus are allocated in turn to respective I/O ports and the respective I/O ports are arranged to transfer AV data between them selves and the video recording and reproducing apparatus in synchronism with a reference video signal through the bus during the allocated time slots only. Strictly speaking, although a plurality of AV data are not recorded/reproduced simultaneously, the simultaneous recording/reproducing of a plurality of AV data is sufficiently realized from the viewpoint of a time interval longer than the time slot.

FIG. 9 shows an example of an overall configuration of the conventional AV server. This AV server is a single body device in which a plurality of I/O processing sections 61 (three I/O processing sections 61a to 61c are shown in the figure), a plurality of RAIDs 62 (five RAIDs 62a to 62e are shown in the figure) and a time slot generating circuit 63 are housed in the same housing 66. The respective I/O processing sections 61 are connected to the respective RAIDs 62 through a down bus 64 and an up bus 65 arranged in the housing 66.

The time slot generating circuit 63 allocates in turn the time slots to the respective I/O processing sections 61 to permit them to use the buses 64 and 65 so as to prevent flowing of AV data from a plurality of I/O processing sections 61 to the bus 64 simultaneously or to prevent flowing of AV data to a plurality of I/O processing sections 61 to the bus 65 simultaneously.

When AV data with a predetermined transmission format is inputted to any one of the I/O processing sections 61 from the outside of the AV server through a data input terminal Din, the I/O processing section 61 executes processing to convert the input data into data of the format recordable in the HD device (e.g. processing to derive AV data from the transmission format and processing to compress the derived data by MPEG or the like) and divides the AV data thus processed by the AV data to be recorded in the respective RAIDs 62 (e.g. divided by the frame). The divided data are transferred to the respective RAIDs 62 through the down bus 64 during the time slots allocated to the relevant I/O processing sections 61.

Additionally, the reason why the input data is not recorded in only one RAID 62 but is divided and recorded in each RAID 62 is that concentrated loads on a specific RAID 62 are avoided.

The respective RAIDs 62 are constructed using the RAID technique. Of the RAIDs 62, in the RAID using e,g, the RAID-3, AV data transferred from the I/O processing section 61 is divided by the definite length and recorded in a plurality of HDDs. At the same time, parity data is generated and recorded in another HDD.

On the other hand, when a reproduction request command is transferred from any of the I/O processing section 61 during the time slots allocated to that I/O processing section through the down bus 64 to the respective RAIDs 62, each of the RAIDs 62 reproduces AV data based on this command (e.g. the RAID using the RAID-3 reproduces divided AV data recorded in a plurality of HDDs. If a trouble occurs in any one of HDDs, then AV data of such HDD are restored using the parity data and those data are integrated). The reproduced AV data is transferred to the I/O processing sections 61 through the up bus 65 during the time slots allocated to that I/O processing sections 61.

The I/O processing section 61 performs a processing to convert AV data into data of a format that is transmissible to the outside (e.g. processing to expand compressed AV data and processing to convert expanded AV data into data of a predetermined transmission format). The AV data thus processed is outputted through a data output terminal Dout from the I/O processing section 61 to the outside of the AV server.

In this manner, each I/O processing section 61 inputs AV data for one channel and outputs AV data for one channel at the same time.

By the way, in the AV server designed as the single body device in which the I/O processing sections and the RAIDs are housed within the same housing as shown in FIG. 9, it is difficult to increase the RAIDs in order to enlarge the recording capacity after the AV server has been manufactured. In other words, this kind of AV server has low freedom of design due to restrictions on the physical structure.

In recent years, general-purpose computers (personal computers, workstations, etc.) becomes highly efficient and inexpensive increasingly and so such general-purpose computers should preferably be used as I/O processing section of AV server from the standpoint of costs. Nevertheless, the AV server in which the I/O processing sections and the RAIDs are held within the same housing as shown in FIG. 9 cannot use the general-purpose computer as its I/O processing section.

Thus, it is conceived to form the AV server itself not as the single body device which holds the I/O processing sections and the RAIDs within the same housing but as a system utilizing a network.

FIG. 10 shows a scheme of an AV server utilizing a network. A single or a plurality of I/O processing sections (three I/O processing sections 71a to 71c are shown in the figure) and a plurality of RAIDs 72 (five RAIDs 72a to 72e are shown in the figure) are connected to each other through a network 73.

When AV data of a predetermined transmission format is inputted to any of the I/O processing section 71 from the outside of the AV server, the I/O processing section 71 performs a processing to convert the AV data into data of a format recordable in the HD device, in the same way as in the I/O processing sections 61 shown in FIG. 9, divides the processed AV data by the AV data to be recorded in the respective RAIDs 72 and transfers the divided data through the network 73 to each RAID 72 together with a recording request command. The respective RAIDS 72 record AV data in the same way as the RAIDs 62 shown in FIG. 9 do so.

FIG. 11 shows AV data to be recorded in each RAID 72 when the I/O processing section 71 divides the AV data by the frame. The RAID 72a records F0, F5, F10, etc. which are AV data of 1st frame, 6th frame, 11th frame, and so on. The RAID 72b records F1, F6, F11, etc, which are AV data of 2nd frame, 7th frame, 12th frame, and so on, The RAID 72c records F2, F7, F12, etc. which are AV data of 3rd frame, 8th frame, 13th frame, and so on. The RAID 72d records F3, F8, F13, etc. which are AV data of 4th frame, 9th frame, 14th frame, and so on. The RAID 72e records F4, F9, F14, etc. which are AV data of 5th frame, 10th frame, 15th frame, and so on.

On the other hand, when a reproduction request command is transferred from any of the I/O processing section 71 through the network 73 to each RAID 72, each RAID 72 reproduces AV data based on this command similarly to the RAID 62 shown in FIG. 9. The reproduced AV data is transferred through the network 73 to the I/O processing section 71. The I/O processing section 71 converts the AV data into data of the format that is transmissible to the outside similarly to the I/O processing section 61 shown in FIG. 9. The AV data thus converted is outputted from the I/O processing section 71 to the outside of this AV server.

In this way, each I/O processing section 61 inputs AV data for one channel and outputs AV data for one channel at the same time.

Additionally, when recording request commands and reproducing request commands from a plurality of I/O processing sections 71 concur with each other, any one of the requests is given priority in accordance with a communication protocol of the network 73 or the order of priority is determined using a switch (not shown) which outputs selectively one of requests inputted thereto from the respective I/O processing sections 71. Accordingly, this AV server also may be assumed to transfer AV data between each I/O processing section 71 and the RAID 72 in a time-division manner.

Such AV server using the network can increase the recording capacity with ease by connecting a new RAID 72 to the network 73, so that a freedom of design will be enhanced. In addition, a general-purpose computer can be used as the I/O processing section and hence this server will be produced inexpensively.

However, the AV server utilizing the network involves a problem that need not be assumed with the AV server which holds the I/O processing sections and the RAIDs within the same housing. Specifically, for example, if a connector joining any RAID to the network is inadvertently separate and an operator of the I/O processing section is un aware of the separation of the connector from the network because the I/O processing section and the RAID are distant from each other, then the relevant RAID is unable to record and reproduce AV data. Accordingly, in reproduction, the AV server outputs AV data which lacks in data portion assigned to that RAID (e.g. if the RAID 72a is unable to record and reproduce AV data in FIG. 11, then AV data F0, F5, F10, etc. of 1st frame, 6th frame, 11th frame, etc. are lost. Consequently, when such AV data is transmitted as a broadcasting program, pictures and sounds are disturbed by noises or interruption.

Although this is not only a problem peculiar to the AV server utilizing the network but also a problem common to the AV server holding the I/O processing section and the RAID within the same housing, When one HDD within one RAID breaks down, data can be restored within the RAID, but when two or more HDDs within one RAID break down, data cannot be restored within the RAID and hence the relevant RAID is also unable to reproduce AV data. As a result, the AV server will output AV data which lacks in data portion assigned to that RAID. Further, when a CPU which controls the whole RAID breaks down within one RAID, the RAID is also unable to record and reproduce AV data, so that the AV server will output AV data which lacks in data portion assigned to that RAID.

In order to output AV data without loss even in such case, there is proposed a method of recording AV data double by back-up RAIDs provided in every RAID. According to this method, however, the number of RAIDs increases twice (ten RAIDs are required in the examples of FIGS. 9 and 10) and also a circuit for deciding which RAID is unable to record and reproduce data as well as a circuit for switching to the back-up RAID are required. Thus, the AV server will be large in scale. Moreover, if AV data is recorded double in the AV server utilizing the network, an amount of data transferred over the network increases twice and so a load imposed upon the network also increases.

SUMMARY OF THE INVENTION

In view of the foregoing aspects, the present invention is made to provide an AV server in which AV data can be outputted without loss in reproduction even when any RAID is unable to record and reproduce data at all and in which the scale enlargement of AV server and the increase of and load imposed on a network when utilizing the network can be prevented.

To solve this problem, the present applicant proposes a data recording and reproducing apparatus comprising a recording and reproducing means for recording and/or reproducing data containing video and/or audio data on and/or from a nonlinearly-accessible recording medium and a plurality of input and output processing means connected to the recording and reproducing means through a predetermined transmission line for processing the data inputted from the outside to output processed data to the recording and reproducing means in a time-division manner and which process the data outputted from the recording and reproducing means in a time-division manner to output processed data to the outside, wherein the plurality of input and output processing means further include input processing means for dividing the data inputted from the outside to transfer divided data to the plurality of recording and reproducing means and which generates an error-correcting code of the data and which transfers the error-correcting code to at least one of the recording and reproducing means and output processing means for correcting erroneous data by using the error-correcting code outputted from one of the recording and reproducing means and which outputs error-corrected data to the outside if an error is detected from the data outputted from the recording and reproducing means.

In this data recording and reproducing apparatus, a plurality of recording and reproducing means for recording and/or reproducing data containing AV data on and/or from a nonlinearly-accessible recording medium (e.g. RAID corresponds to this recording and reproducing means) and a plurality of input and output processing means for processing the data containing AV data inputted from the outside to output processed data to these recording and reproducing means in a time-division manner and which process the data containing AV data outputted from these recording and reproducing means in a time-division manner to output processed data to the outside are connected through a predetermined transmission line.

When data is recorded, inputted data from the outside containing AV data is distributed to a plurality of recording and reproducing means by the input processing means within the I/O processing means. At the same time, an error-correcting code for the data is generated and transferred to at least one recording and reproducing means. Therefore, the input data is assigned to and recorded in two or more recording and reproducing means and also the error-correcting code is recorded in at least one recording and reproducing means.

On the other hand, when data is reproduced, the data and its error-correcting code reproduced by each recording and reproducing means are transferred to the I/O processing means. Then, when the output processing means within the I/O processing means detects an error in the data, the data is corrected by the output processing means using the error-correcting code and outputted to the outside. Accordingly, when data is not reproduced by any of the recording and reproducing means, the data is restored by the error-correcting code and outputted to the outside.

As described above, according to the data recording and reproducing apparatus, the error-correcting code of input data are generated on the side of I/O processing means and recorded in at least one recording and reproducing means, and also data which was not reproduced by any recording and reproducing means is restored by the error-correcting code. Consequently, even if the recording and reproducing means is unable to record and reproduce data because two or more recording sections within any recording and reproducing means (e.g. each HDD in the RAID corresponds to this recording section) break down or a circuit disposed within the recording and reproducing means to control the whole thereof (CPU, etc.) breaks down, the data recording and reproducing apparatus will output data without lack in reproduction.

Furthermore, since the amount of data to be recorded increases only by the amount of the error-correcting code, as compared with the case where data is recorded double by the back-up recording and reproducing means provided in every recording and reproducing means, the number of the recording and reproducing means can be reduced, so that the data recording and reproducing apparatus is prevented from being larger in scale.

Additionally, in the data recording and reproducing apparatus, when such trouble generates that the data or error-correcting code can not be recorded on the recording and reproducing means, it is further preferable for the input processing means to include recorded-data restoring means for restoring the data or error-correcting code which failed to be recorded due to this trouble and outputting the restored data or error-correcting code to the recording and reproducing means after the trouble is solved.

As a result, because all input data and their error-correcting codes are recorded in the recording and reproducing means during data recording, data that the recording and reproducing means has failed to reproduce can be restored more surely for outputting without miss during data reproduction.

Moreover, the data recording and reproducing apparatus according to the present invention may utilize the Ethernet or the Fibre Channel or the network based on the IEEE 1394 standard as the predetermined transmission line.

In this case, e,g, even when a connector for joining any recording and reproducing means to the network is separate by mistake, data can be outputted without loss. Further, because the amount of data transferred over the network increases only by the amount of error-correcting codes, as compared with the case where the amount of data transferred over the network increases twice by recording data double, the load imposed on the network will be prevented from increasing.

Next, the present applicant proposes a data recording and reproducing method comprising the steps of processing data containing video and/or audio data inputted from the outside to output processed data to a plurality of recording and reproducing means in a time-division manner, recording said data on a nonlinearly-accessible recording medium by said recording and reproducing means, reproducing said recorded data from said nonlinearly-accessible recording medium, outputting said reproduced data from said recording and reproducing means in a time-division manner, processing said outputted data and outputting said processed data to the outside comprising the following four steps: a first step of dividing and transferring said data inputted from the outside to said plurality of recording and reproducing means, generating an error-correcting code of said data and outputting said error-correcting code; a second step of recording said divided data on said recording medium by these recording and reproducing means and recording said error-correcting code on said recording medium by each of said recording and reproducing means; a third step of reproducing said data from said recording medium by each of said recording and reproducing means, reproducing said error-correcting code from said recording medium by each of said recording and reproducing means and outputting said reproduced data and said reproduced error-correcting code in a time-division manner through a predetermined transmission line; and a fourth step of correcting erroneous data by using said error-correcting code outputted from said recording and reproducing means and outputting said error-corrected data to the outside if an error is detected from said data outputted from said recording and reproducing means.

According to this data recording and reproducing method, when data is recorded, inputted data from the outside containing AV data is divided and transferred into a plurality of recording and reproducing means and recorded on these recording and reproducing means, as well as the error-correcting code of the data are generated and outputted to be recorded in the recording and reproducing means. Accordingly, the input data is assigned to and recorded in two or more recording and reproducing means, and also the error-correcting code is recorded in at least one recording and reproducing means.

On the other hand, in reproduction of data, when an error is detected in the data reproduced and outputted by the recording and reproducing means, the erroneous data is corrected by using the error-correcting code reproduced and outputted from the recording and reproducing means, and the corrected data is outputted to the outside. Therefore, when any recording and reproducing means fails to reproduce data, such data will be restored by the error-correcting code and outputted to the outside.

As described above, according to the data recording and reproducing method, the error-correcting code of the input data is generated and recorded in at least one recording and reproducing means, and also data that any recording and reproducing means has failed to reproduce is restored using the error-correcting code. Therefore, even if the recording and reproducing means fails to record and reproduce data at all e,g, because two or more recording sections within any recording and reproducing means break down or the circuit disposed within the recording and reproducing means to control the whole thereof breaks down, the data recording and reproducing apparatus is able to output data to the outside without a miss in reproduction.

Also, because the amount of data to be recorded increases only by the amount of the error-correcting code, as compared with the case where data is recorded double by the back-up recording and reproducing means provided in every recording and reproducing means, the number of the recording and reproducing means can be reduced and hence the data recording and reproducing apparatus will be prevented from being larger in scale.

Additionally, in the data recording and reproducing method also, it is preferable that the first step further includes a data restoring step of restoring the data or error-correcting code and outputting the restored data or restored error-correcting code to the recording and reproducing means after a trouble in which the data or error-correcting code cannot be recorded on the recording and reproducing means had been removed.

As a consequence, because all input data and error-correcting codes are recorded in the recording and reproducing means when data is recorded, data that the recording and reproducing means has failed to reproduce can be restored more reliably in reproduction of data, so that data can be outputted without loss.

This data recording and reproducing method may also utilize the Ethernet or the Fibre Channel or the network based on the IEEE 1394 standard as the transmission line for transmitting the data and the error-correcting code outputted to or from the recording and reproducing means.

In this case, e,g, even when a connector for joining any recording and reproducing means to this network is separate by mistake, data can be outputted without loss. Further, because the amount of data transferred over the network increases only by the amount of error-correcting codes, as compared with the case where the amount of data transferred over the network increases twice by recording data double, the load imposed on the network will be prevented from increasing.

BRIEF DESCRIPTION OF THE DRAWINGS

FIG. 10 is a block diagram showing a scheme of an AV server utilizing a network; and FIG. 11 is a diagram showing data to be recorded in the RAIDs shown in FIG. 10.

DESCRIPTION OF THE PREFERRED EMBODIMENTS

In the following description, an example in which the present invention is applied to the AV server utilizing the network and an example in which the present invention is applied to the AV server holding the I/O processing sections and the RAIDs within the same housing will be described, respectively.

Figure 1:
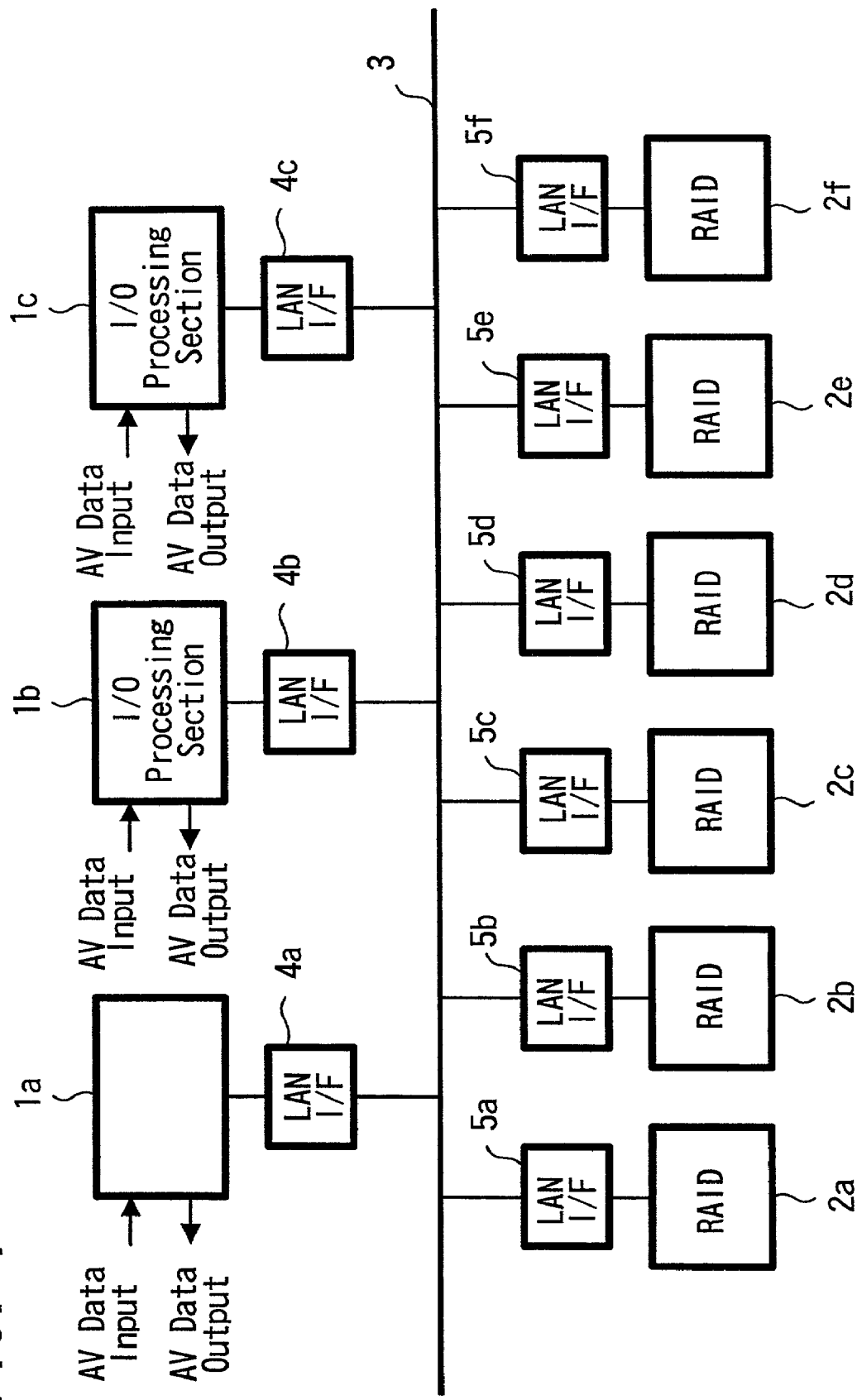
FIG. 1 is a block diagram showing an example of an overall configuration of an AV server to which the present invention is applied.

FIG. 1 shows an example of an overall configuration of an AV server to which the present invention is applied. This server uses the Ethernet 3 which is a kind of LAN (local area network). Three I/O processing sections 1a to 1c (hereinafter collectively referred to as an I/O processing section 1) are connected to the Ethernet 3 through LAN interfaces 4a to 4c, respectively. Six RAIDs 2a to 2f (hereinafter collectively referred to as a RAID 2) are also connected to the Ethernet 3 through LAN interfaces 5a to 5f, respectively.

Figure 2:
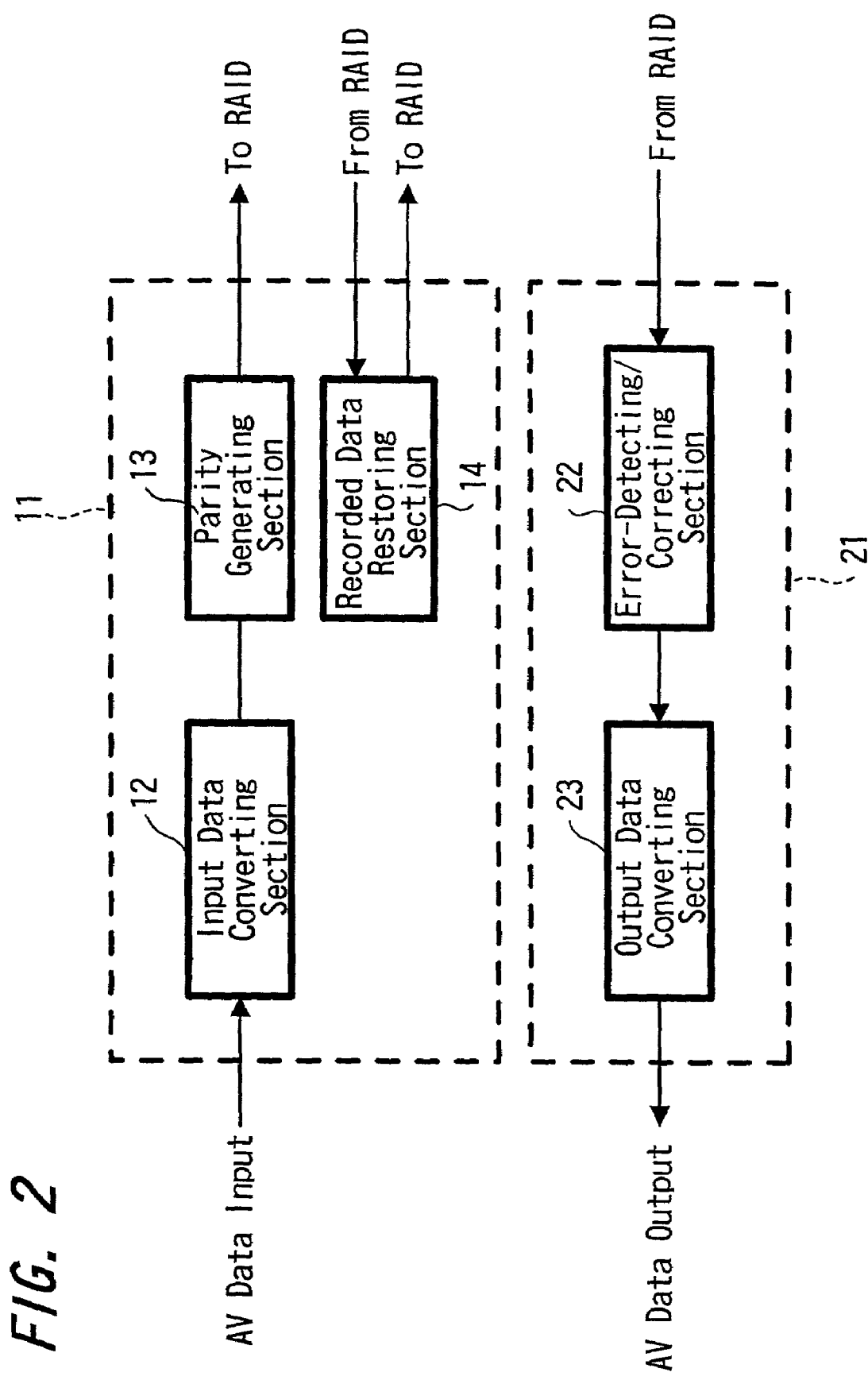
FIG. 2 is a functional block diagram of the I/O processing section shown in FIG. 1.

Each of the I/O processing section 1 is made up of a workstation. FIG. 2 shows functions of the I/O processing section 1, which are implemented by the workstation's executing programs. The functions of the I/O processing section 1 are roughly classified into an input processing section 11 and an output processing section 21.

The input processing section 11 includes an input data converting section 12, a parity generating section 13 and a recorded data restoring section 14. The input data converting section 12 performs a processing to convert AV data of a predetermined transmission format (e.g. SDI (Serial Digital Interface: standardized as the SMPTE-259M) or SDTI (Serial Data Transport Interface: standardized as SMPTE-305M)) inputted to the I/O processing section 1 from the outside of the AV server into data of a format recordable in the HD device (e.g. processing to extract AV data from the transmission format or processing to compress the extracted AV data by MPEG or the like) and divides every frame of the AV data thus processed into data blocks to be recorded in the five RAIDs 2a to 2e (FIG. 1). When the above data is divided, e,g, one frame of AV data may be divided by one byte and recorded in the RAIDs 2a to 2e in this order. Alternatively, one frame of AV data may be divided by ⅕ frame and recorded in the RAIDs 2a to 2e.

The parity generating section 13 generates parity data which is exclusive-OR of data blocks divided by the input data converting section 12 for every frame of AV data.

Data blocks of each frame divided by the input data converting section 12 are transferred from the input processing section 11 through the Ethernet 3 (FIG. 1) to the RAIDs 2a to 2e together with a recording request command. The parity data generated by the parity generating section 13 is transferred together with the recording request command from the input processing section 11 through the Ethernet 3 to the RAID 2f (FIG. 1) of RAID 2, which is inhibited from recording AV data.

The recorded data restoring section 14 makes an error table indicative of errors resulting when any of RAIDs has failed in recording these data blocks and parity data transferred from the I/O processing section 1 to each RAID 2 and restores data to be recorded in the relevant RAID 2 with reference to the error table on condition that the relevant RAID 2 recovers.

The decision that any RAID 2 has failed to record data is made based on information obtained through the Ethernet 3 (e.g. contents of status data returned from each RAID 2 in response to the recording request command or a time-out of communication (this shows that status data has not been returned within a fixed time period). It is also decided based on information obtained through the Ethernet 3 whether or not the RAID 2 has recovered.

Data to be recorded in the RAID 2 are restored by transferring reproduction request commands from the input processing section 11 to respective RAIDs 2 other than the RAID 2 and using the data blocks and the parity data transferred to the input processing section 11 after being reproduced by those RAIDs 2.

Data restored by the recorded data restoring section 14 is transferred again from the input processing section 11 to the RAID 2 in which the restored data should be recorded (the recovered RAID 2) together with the recording request command.

The output processing section 21 includes an error-detecting/correcting section 22 and an output data converting section 23. The error-detecting/correcting section 22 detects data block code errors from the data blocks and parity data transferred from each RAID 2 through the Ethernet 3 to the output processing section 21 for correcting erroneous data blocks. Accordingly, even when any of the RAIDs 2a to 2e has failed in reproducing data blocks, the error-detecting/correcting section 22 restores, from the transferred remaining data blocks and parity data the data, blocks, not transferred. It is decided whether or not any of the RAIDs 2a to 2e has failed in reproducing data blocks e,g, based on a time-out of communication (showing that data blocks have not been transferred from the relevant RAID within a fixed time period).

The output data converting section 23 performs processing to integrates data blocks of each frame, which have been processed by the error-detecting/correcting section 22, into one frame of AV data and convert the integrated AV data into data of a format that is transmissible to the outside (e.g. a processing to expand compressed AV data and a processing to convert expanded AV data into data of a predetermined transmission format as above-described SDI, SDTI or the like). The AV data that has been processed by the output data converting section 23 is outputted from the I/O processing section 1 to the outside of the AV server.

The RAIDs 2a to 2e shown in FIG. 1 employ the RAID-3, respectively. Each of them includes, though not shown, a plurality of HDDs for recording AV data; one HDD for recording parity data; a recording data controller for separating data blocks and command transferred from the I/O processing section 1; a CPU for controlling the whole RAID based on the command separated from the data blocks by the recording data controller to issue status data; a demultiplexer/multiplexer for further dividing the data block separated by the recording data controller into the respective HDDs for recording AV data and integrating data reproduced by those HDDs into the original data block; a parity generating section for degenerating parity data for data divided by the demultiplexer/multiplexer and supplying the parity data to a HDD for recording parity data; and a reproducing data controller for adding status from the CPU to the data block integrated by the demultiplexer/multiplexer for transferring the resultant data to the I/O processing section 1.

The RAID 2f shown in FIG. 1 employs the RAID-1 and includes, though not shown, a recording data controller for separating the parity data and command transferred from the I/O processing section 1; a CPU for controlling the whole RAID based on the command separated from the parity data by the recording data controller to issue status data; two HDDs for double recording the parity data separated by the recording data controller; and a reproducing data controller for adding the status data from the CPU to the parity data reproduced by those HDDs for transferring resultant data to the I/O processing section 1.

However, the RAID 2f may employ the RAID-3 also.

An operation of recording and reproducing AV data in this AV server is as follows.

Figure 3:
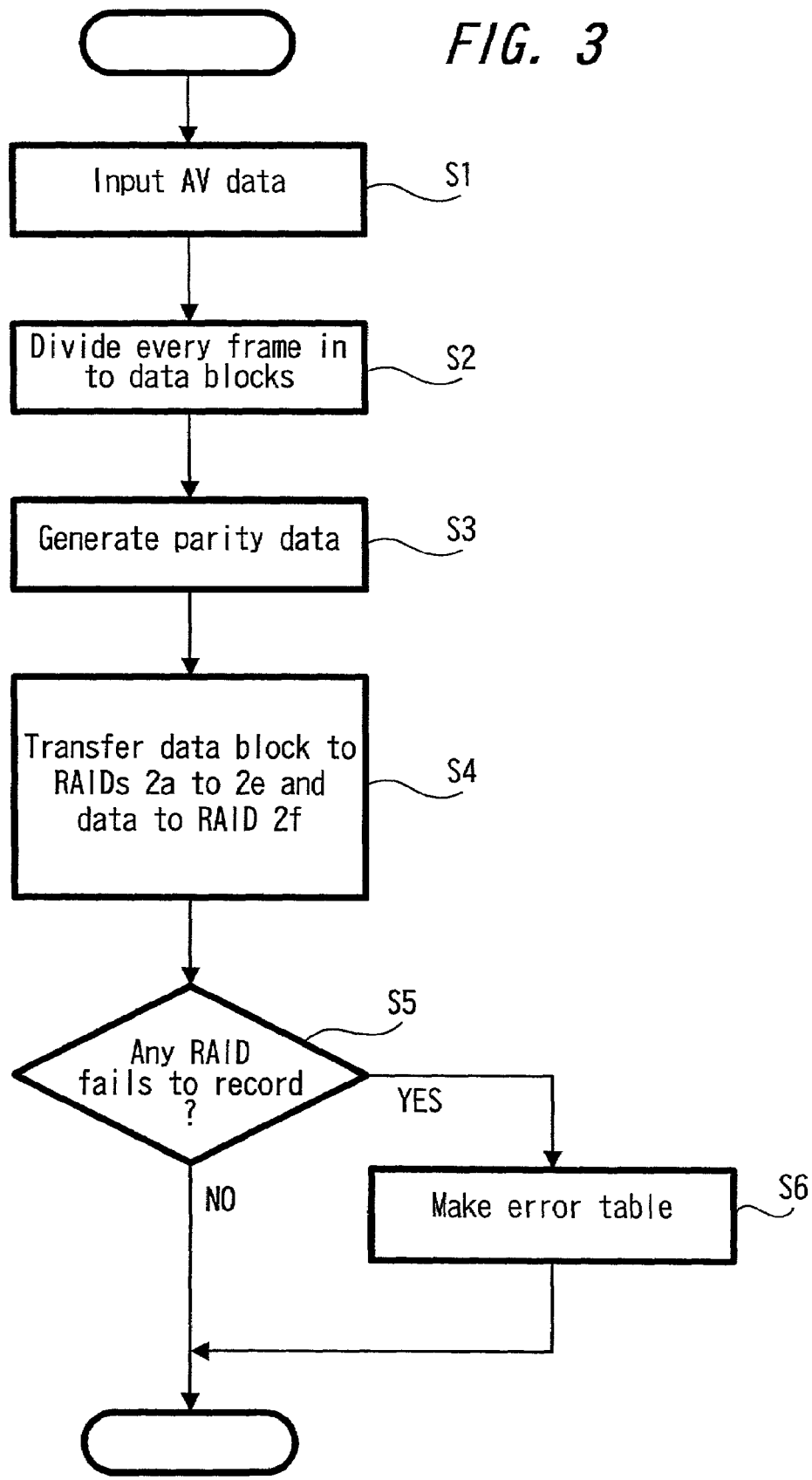
FIG. 3 is a flowchart showing a processing executed by the I/O processing section shown in FIG. 2.

As shown in FIG. 3, when AV data is inputted to any I/O processing section 1 from the outside of the AV server (step S1), the AV data is converted into data of a format recordable in the HD device by the input data converting section 12 of the input processing section 11 in that I/O processing section 1 and divided in every frame into data blocks that should be recorded in the five RAIDs 2a to 2e (step S2).

Subsequently, the parity generating section 13 of the input processing section 11 generates parity data for every frame of AV data (step S3). That input processing section 11 transfers the data blocks to the RAIDs 2a to 2e and also transfers the parity data to the RAID 2f (step S4).

Subsequently, it is decided by the recorded data restoring section 14 of that input processing section 11 whether or not any RIAD 2 has failed in recording these data blocks and parity data (step S5). If it is decided that any RIAD 2 has not recorded these data blocks and parity data, then the error table is created (step 6).

Figure 4:
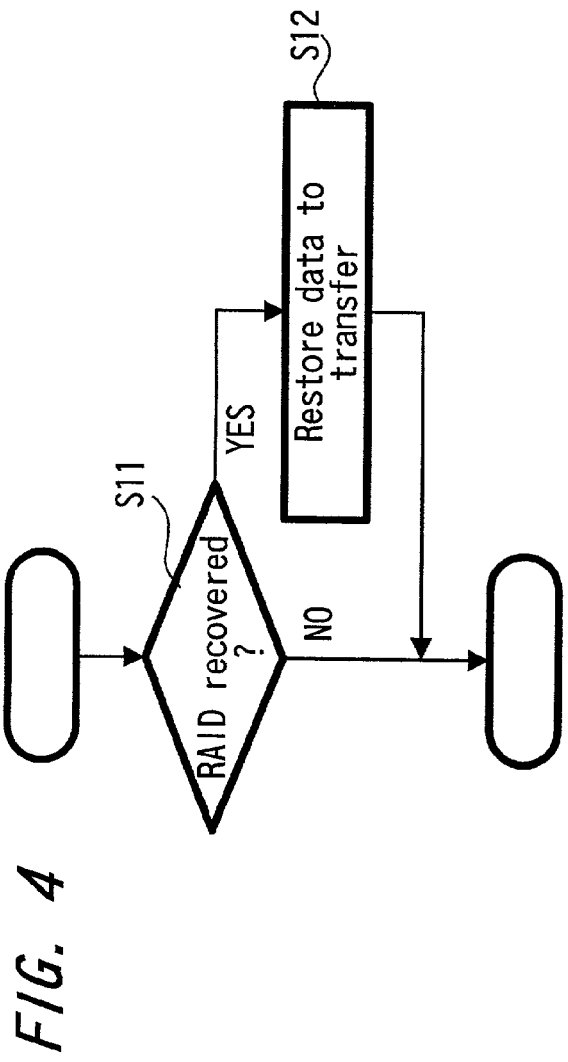
FIG. 4 is a flowchart showing a processing executed by the input processing section shown in FIG. 2.

The recorded data restoring section 14 decides, whether as an interrupt processing at every predetermined time for example, as shown in FIG. 4, or not the RAID 2 of RAIDS 2 which created the error table so far has recovered (step S11). If it is decided that it has recovered, then data to be recorded in the relevant RAID 2 is restored and transferred to that RAID 2 (step S12).

Figure 5:
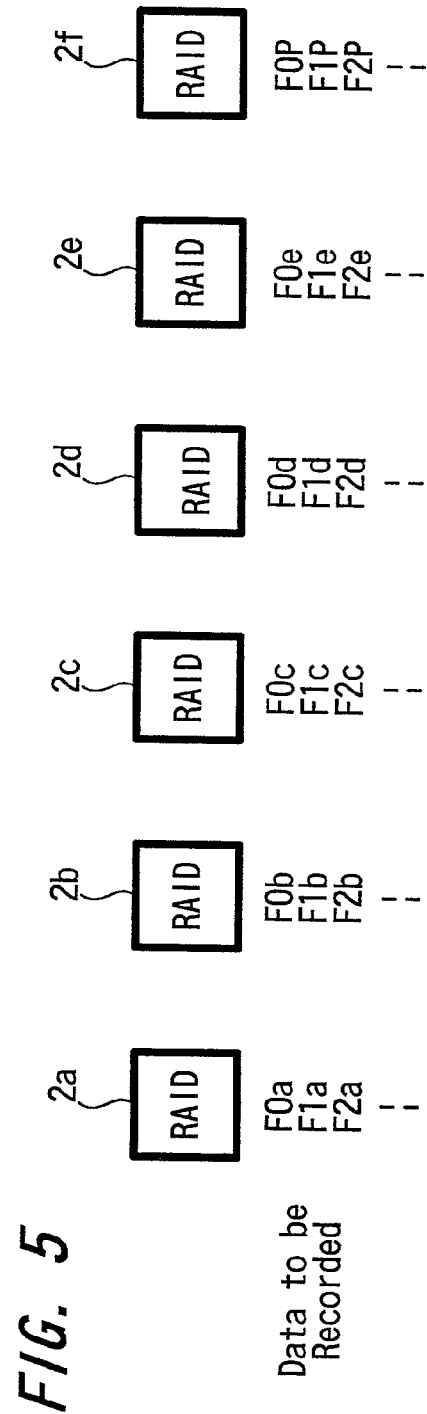
FIG. 5 is a diagram showing data to be recorded in the RAIDs shown in FIG. 1.

In this way, as shown in FIG. 5, five data blocks F0 to F0e, F1a to F1e, F2a to F2e, etc. into which every frame of AV data F0. F1, F2, etc. was divided are recorded in the respective RAIDs 2a to 2e by the data block and also parity data F0P, F1P, F2P, etc. for each frame of the AV data F0, F1, F2, etc. are recorded in the RAID 2f.

Figure 6:
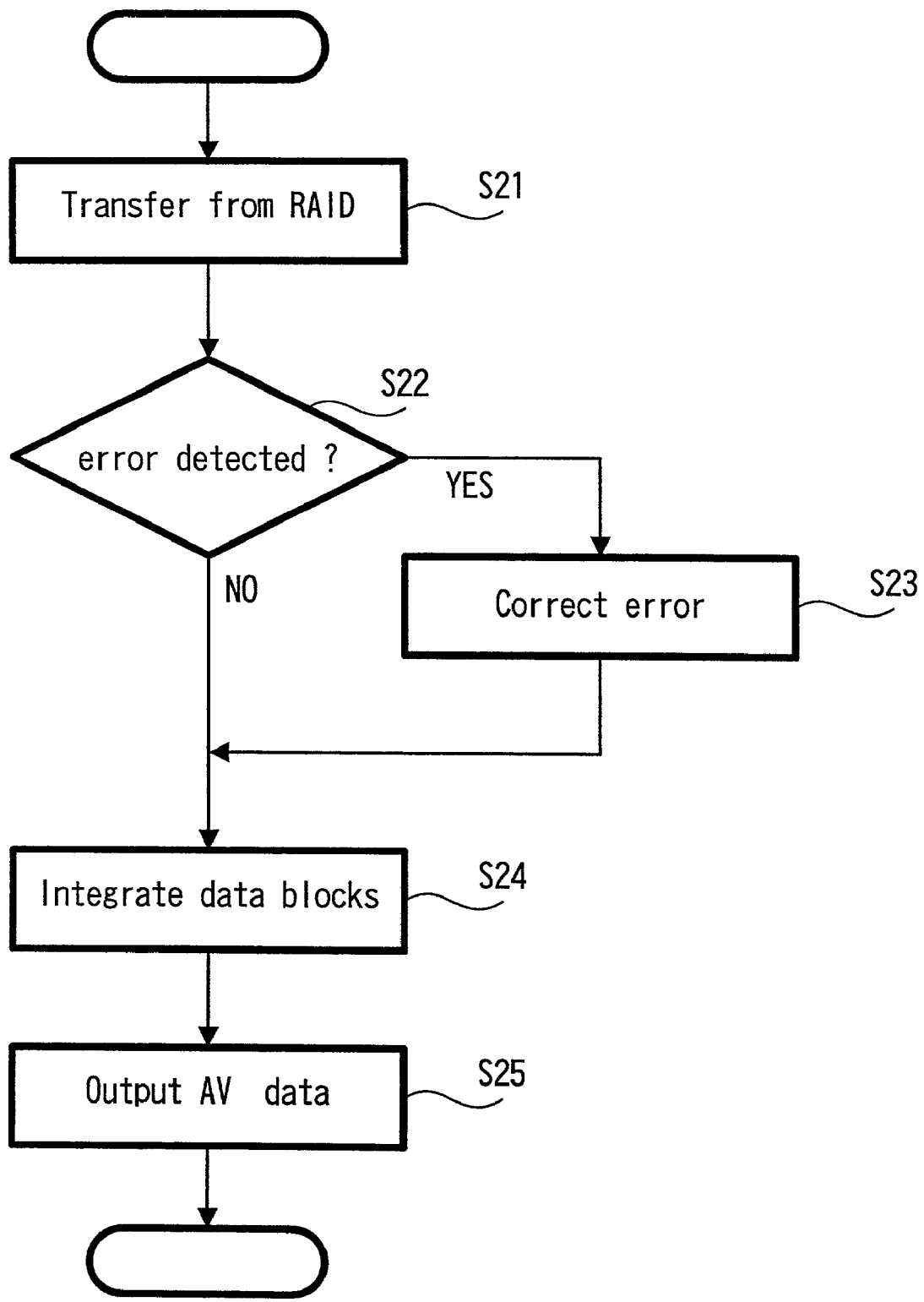
FIG. 6 is a flowchart showing processing executed by the output processing section shown in FIG. 2.

When the reproduction request command is transferred from the output processing section 21 of any I/O processing section 1 through the Ethernet 3 to each RAID 62, the RAIDs 2a to 2e reproduce data blocks of AV data and the RAID 2f reproduces parity data for the data blocks. These data blocks and parity data are transferred through the Ethernet 3 to the output processing section 21 (step S21) as shown in FIG. 6.

Subsequently, the error-detecting/correcting section 22 in the output processing section 21 detects code errors of these data blocks (step S22) and corrects erroneous data blocks (step S23).

Subsequently, these data blocks are unified and converted to those of the format transmissible to the outside by the outputted data converting section 23 in the output processing section 21 (step S24), and outputted from the I/O processing section 1 to the outside of this AV server (step S25).

In this manner, each I/O processing section 1 can input AV data for one channel and output AV data for one channel at the same time.

Incidentally, when recording requests and reproducing requests from a plurality of I/O processing sections 1 concur with each other, any one of requests is given priority in accordance with a communication protocol of the Ethernet (alternatively, a switch (not shown) for selecting and outputting one request from requests inputted from each I/O processing section 11 may be used to decide the order of priority).

As described above, in the AV server, the parity data of input AV data are generated on the side of the I/O processing section 1 and recorded in RAID 2f of the RAID 2, which is inhibited from recording the AV data. AV data which has not been reproduced by any of the RAIDs 2a to 2e is restored using the parity data.

Accordingly, for example, even if the connector for joining any one of the RAIDs 2a to 2e to the Ethernet 3 is separate by mistake, the AV server is able to output AV data without miss when reproducing AV data. Even when two or more HDDs break down in any of the RAIDs 2a to 2e or the CPU for controlling the whole RAID breaks down, this server is able to output AV data without miss.

Moreover, if data transferred to each RAID 2 from the I/O processing section 1 is not recorded in any of RIAD 2, then since the data blocks to be recorded in that RAID 2 are restored and transferred again to that recovered RAID 2. Thus, when AV data is recorded, all input AV data and its parity data are recorded in the RAID 2. Therefore, when AV data is reproduced, the data blocks that any of the RAIDs 2a to 2e has failed to reproduce are can be restored more reliably and so AV data can be outputted completely.

Since there are provided six RAIDs including the RAIDs 2a to 2e for recording AV data and the RAID 2f for recording parity data, as compared with the case where ten RAIDs are needed as AV data is recorded double by the back-up RAIDs provided for every RAID 2a to RAID 2e, the number of the RAIDs can be reduced. Therefore, the AV server is prevented from being larger in scale.

Furthermore, because the amount of data transferred over the Ethernet 3 increases only by the amount of parity data, as compared with the case where the amount of data transferred over the Ethernet 3 increases twice by recording the AV data double, a load imposed on the Ethernet 3 is also prevented from increasing.

Figure 7:
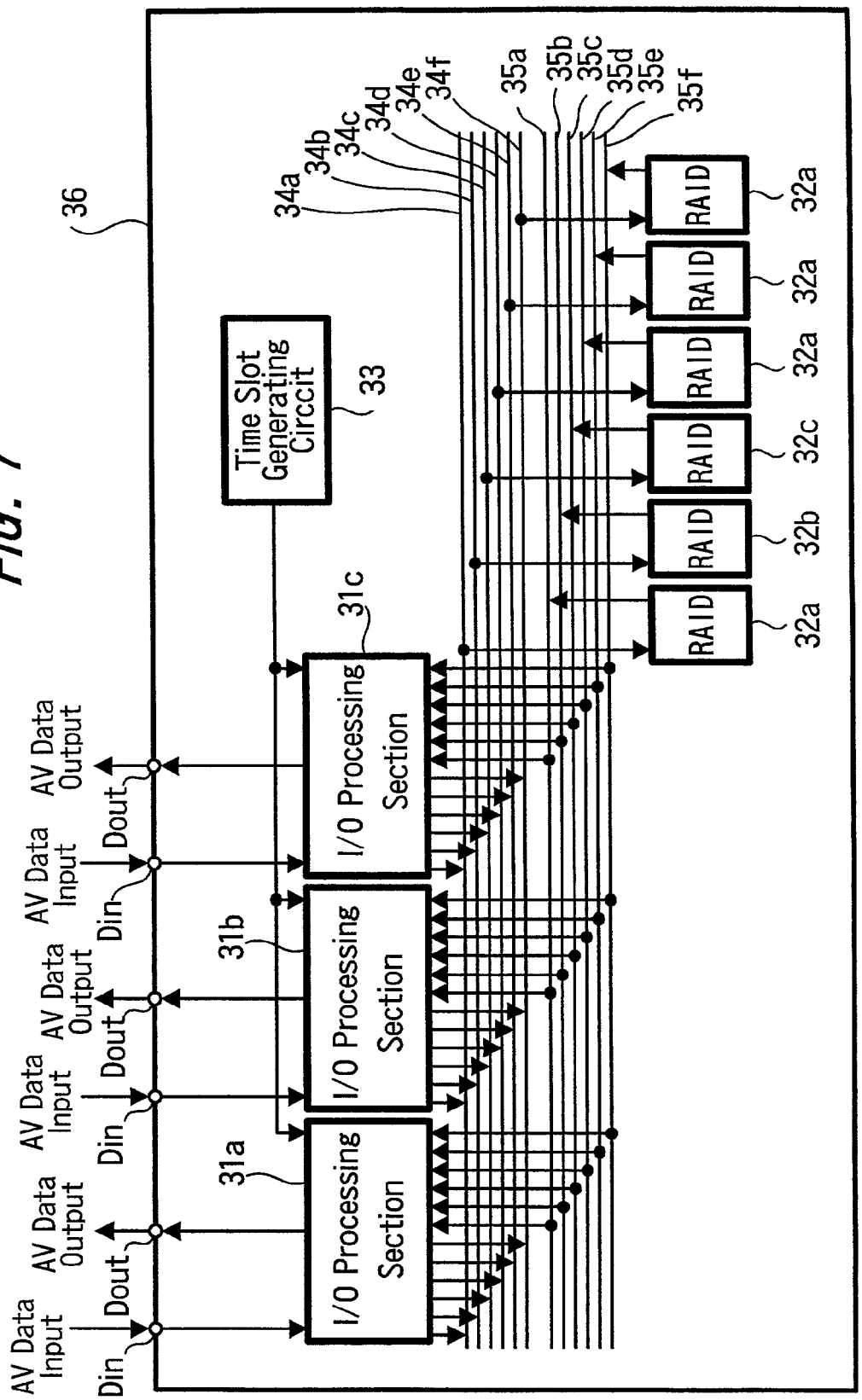
FIG. 7 is a block diagram showing an example of an overall configuration of another AV server to which the present invention is applied.

Next, FIG. 7 shows an example of an overall configuration of another AV server to which the present invention is applied. This AV server is constructed as a single body device which holds I/O processing sections and RAIDs within the same housing. A housing 36 holds three I/O processing sections 31a to 31c (hereinafter collectively referred to as an I/O processing section 31), six RAIDs 32a to 32f (hereinafter collectively referred to as a RAID 32) and a time slot generating circuit 33. The respective I/O processing sections 31 are connected through six down buses 34a to 34f and six up-link buses 35a to 35f to the RAIDS 32a to 32f individually. The buses 34a to 34f and 35a to 35f are SCSI buses.

The time slot generating circuit 33 allocates the respective I/O processing sections 31 time slots for allowing them to use the buses 34a to 34f and 35a to 35f in turn so that AV data from a plurality of I/O processing sections 31 may not flow simultaneously to the buses 34a to 34f or AV data to a plurality of I/O processing sections 31 may not flow simultaneously to the buses 35a to 35f.

Figure 8:
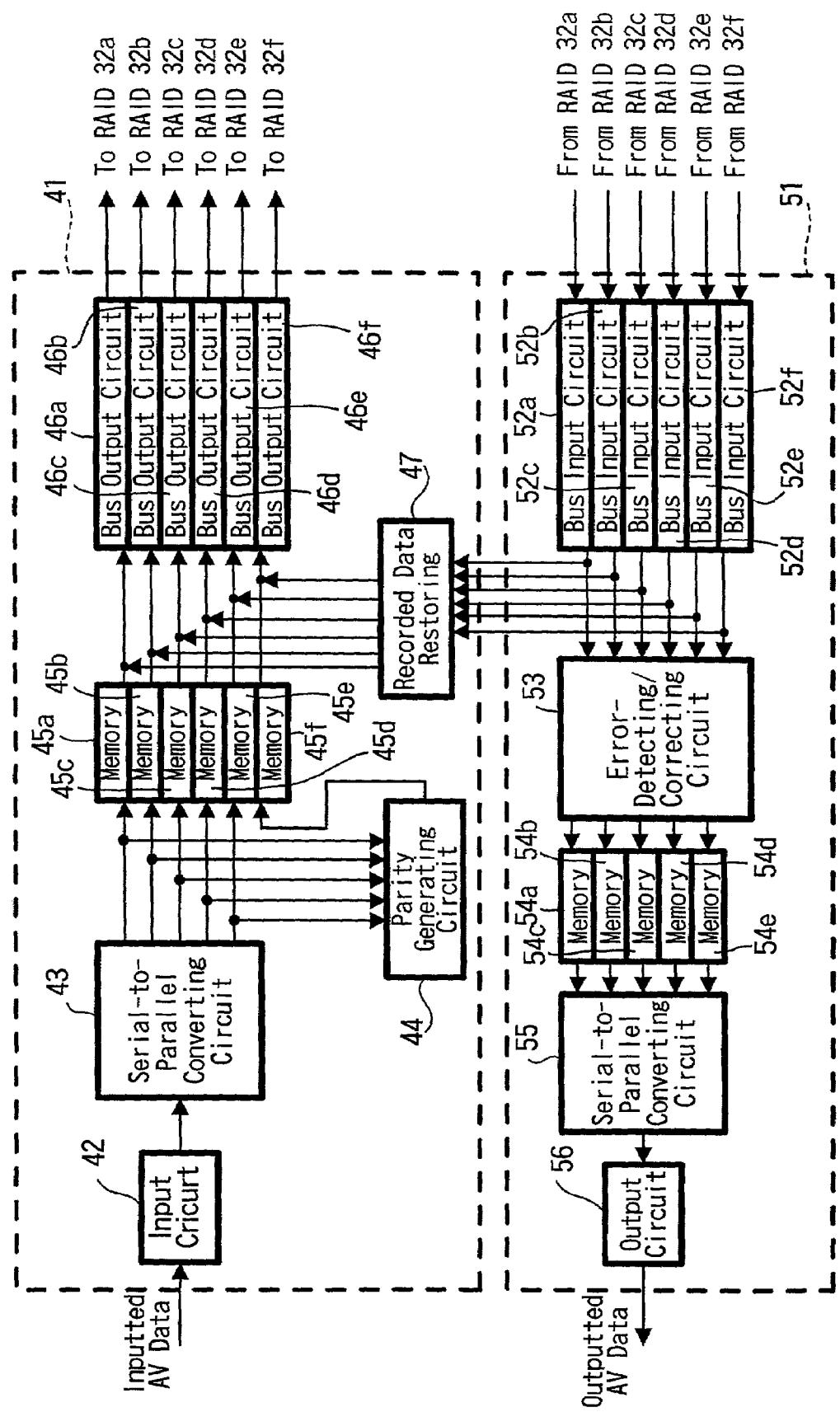
FIG. 8 is a block diagram showing a structure of the I/O processing section shown in FIG. 7.
Figure 9:
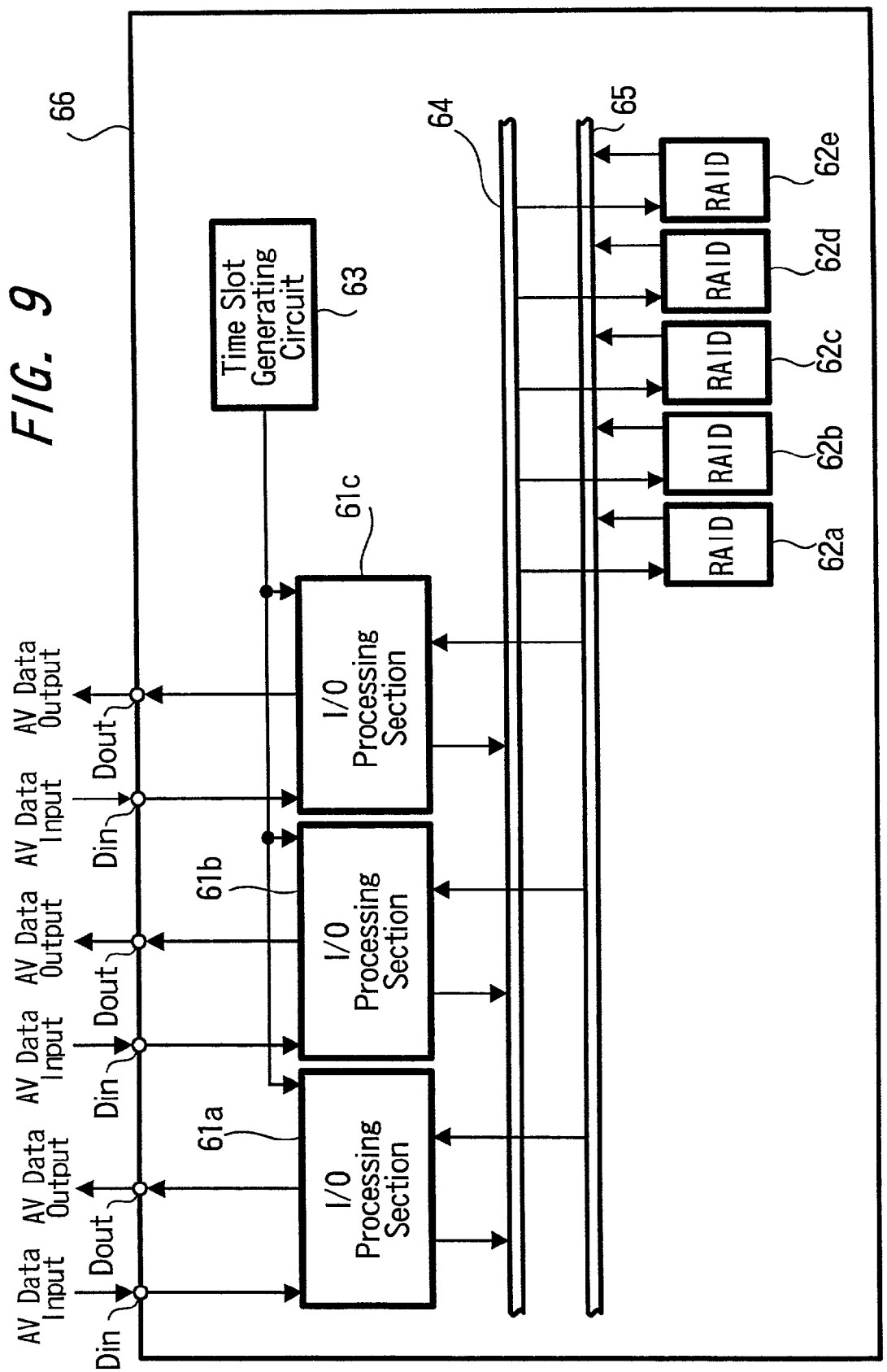
FIG. 9 is a block diagram showing an example of an overall configuration of a conventional AV server.

FIG. 8 shows an example of the structure of each I/O processing section 31. The I/O processing section 31 is roughly classified into an input processing section 41 and an output processing section 51.

The input processing section 41 includes an input circuit 42, a serial-to-parallel converting circuit 43, a parity generating circuit 44, memories 45a to 45f, bus output processing circuits 46a to 46f and a recorded data restoring circuit 47.

The input circuit 42 converts AV data of a predetermined transmission format (e.g. SDI) inputted to the I/O processing section 31 from the outside of the AV server through a data input terminal Din (FIG. 7) into data of a format recordable in the HD device. The serial-to-parallel-converting circuit 43 divides every frame of the AV data having been processed by the data converting circuit 42 into data blocks to be recorded in the five RAIDs 32a to 32e (FIG. 7). In short, the input converting circuit 42 and the serial-to-parallel converting circuit 43 function similarly to the input data converting section 12 shown in FIG. 2.

The parity generating circuit 44 generates parity data which is exclusive-OR of data blocks divided by the serialto-parallel converting circuit 43 for every frame of AV data similarly to the parity generating circuit 13 shown in FIG. 2.

The data blocks divided by the serial-to-parallel converting circuit 43 are stored in the memories 45a to 45e, and the parity data generated by the parity generating circuit 44 is stored in the memory 45f. The data blocks and parity data stored in the memories 45a to 45f are sequentially read from these memories into the time slots allocated to the I/O processing sections 31, converted into data of transmission format of SCSI bus by the bus output processing circuits 46a to 46f, and transferred together with the recording request command through the respective down buses 34a to 34f (FIG. 7) to the RAIDs 32a to 32f.

Based on information supplied from bus input processing circuits 52a to 52f of an output processing section 51 to be described below, (e.g. contents of status data returned from the respective RAIDs 32 in response to the recording request command and a time-out of communication) the recorded data restoring circuit 47 creates the error table indicative of errors resulting when of RIADs 32 has failed in recording these data blocks and parity data transferred from the I/O processing section 41 to the RIADs 32, and restores data to be recorded in the relevant RIAD 32 with reference to the error table on the condition that the relevant RIAD 32 has recovered.

Data restored by the recorded data restoring circuit 47 are transferred again through the bus output processing circuits 46a to 46f during the time slots allocated to the respective input processing sections 41 to the RAID 32 (recovered RAIDs 32) in which the restored data should be recorded.

The output processing section 51 includes bus input processing circuits 52a to 52f, an error-detecting/correcting circuit 53, memories 54a to 54e, a parallel-to-serial converting circuit 55 and an output circuit 56.

The bus input processing circuits 52a to 52f extract the data blocks and its parity data from the data transferred on the transmission format of SCSI bus to the output processing section 51 from the RAIDs 32a to 32f through the up-link buses 35a to 35f (FIG. 7). The error-detecting/correcting circuit 53 detects data bock code errors from those blocks and its parity data and corrects erroneous data blocks similarly to the error-detecting/correcting section 22 shown in FIG. 2.

The data blocks having been processed by the error-detecting/correcting circuit 53 are stored in the memories 54a to 54e, sequentially read out of the memories 54a to 54e at a predetermined rate and supplied to the parallel-to-serial converting circuit 55.

The parallel-to-serial converting circuit 55 integrates the data blocks of each frame into of one frame of AV data. The output circuit 56 converts the AV data integrated by the parallel-to-serial converting circuit 55 into data of the format that is transmissible to the outside. In other words, the parallel-to-serial converting circuit 55 and the output circuit 56 can function similarly to the output data converting section 23 shown in FIG. 2. The AV data processed by the output circuit 56 is outputted through a data output terminal Dout (FIG. 7) from the I/O processing section 31 to the outside of this AV server.

The RAIDs 32a to 32e shown in FIG. 7 employ the RAID-3 similarly to the RAIDs 2a to 2e shown in FIG. 1. The RAID 32f shown in FIG. 7 employs the RAID-1 similarly to the RAID 2f shown in FIG. 1 (However, RAID 32f also may employ the RAID-3).

When AV data is recorded and reproduced, this AV server operates similarly to the AV server shown in FIG. 2 excepting that the respective I/O processing sections 31 use the buses 34a to 34f and 35a to 35f during the allocated time slots. The I/O processing section 31 generates the parity data of the inputted AV data and records the same in the RAIDs 32f of RAID 32f, in which AV data should not be recorded, and restores AV data that any of the RAID 32a to RAID 32e has failed to reproduce by using the parity data.

Therefore, even when two or more HDDs in any of the RAID 32a to the RAID 32e break down or when the CPU which controls the whole RAID breaks down, the data recording and reproducing apparatus can output AV data without miss.

In addition, when any of the RIADs 32 has failed in recording data transferred to each RAID 32 from the I/O processing section 31, because data to be recorded in that RAID 32 is restored and transferred again to the recovered RAID 32, all inputted AV data and its parity data are recorded in the RAID 32 on recording AV data. Accordingly, when AV data is reproduced, data blocks that could not be reproduced by any of RAID 32a to RAID 32e can be restored more surely and hence AV data can be outputted completely.

Moreover, because there are provided six RAIDs of the RAID 32a to RAID 32e for recording AV data and the RAID 32f for recording parity data, as compared with the case where ten RAIDS are required when AV data is recorded double by the back-up RAIDS provided in every RAIDS 32a to RAID 32e, the number of RAIDs can be reduced and so the AV server can be prevented from being larger in scale.

Incidentally, while the AV server utilizing the Ethernet is shown in FIG. 1, the present invention can be applied to an AV Server which utilizes network other than the Ethernet (e.g. Fiber Channel or the network based on the IEEE 1394 standard).

Furthermore, the I/O processing section of the AV server shown in FIG. 1 is not limited to the workstation, but personal computers or exclusively-designed devices may be used therefor.

While the AV server which holds the I/O processing sections and the RAIDs within the same housing is illustrated in FIG. 7, the present invention may also be applied to an AV server in which has I/O processing sections and RAIDs connected by SCSI bus or the like instead of holding them within the same housing and instead of utilizing the network.

While the AV servers shown in FIGS. 1 and 7 include the three I/O processing sections, the server may include one, two or more than four I/O processing sections and over.

The AV servers shown in FIGS. 1 and 7 make record the divided AV data in the five RAIDs of six RAIDs and record parity data in one remaining RAID in which AV data should not be stored. However, the divided AV data may be recorded in each of the six RAIDs and also parity data may be divided and stored in each of them.

While the AV servers shown in FIGS. 1 and 7 include five RAIDs to record AV data, the servers may include three, four or six RAIDs and over to record AV data. Even though the RAIDs to record AV data increase, only one RAID is sufficient to record parity data. Accordingly, as the number of RAIDs to record AV data increases, the effects of making the AV server small in scale will be remarkable as compared with the case where AV data is recorded double by the backup RAIDs.

In the AV servers shown in FIGS. 1 and 7, the I/O processing section generates the parity data and restores AV data using the parity data. However, the I/O processing section may generate error-correcting codes other than the parity data (e.g. Reed Solomon code or CRCC code) to restore AV data using such error-correcting codes.

In the AV servers shown in FIGS. 1 and 7, every frame of AV data is divided into data blocks to be recorded in each RAID. Every length of AV data other than one frame may be divided into data blocks (e.g. every data for a predetermined time or every field).

The present invention may also be applied to an AV server for recording AV data on nonlinear accessible recording medium other than HD (e.g. semiconductor memory or optical disk) or an AV server having AV data edit function in addition to AV data recording/reproducing function.

The present invention may also be applied to other data recording and reproducing apparatus than AV servers, in which I/O Reprocessing means for inputting and outputting data between itself and also the outside and for transferring data between itself and a recording and reproducing means are connected through a predetermined transmission lines to the recording and reproducing means for recording and/or reproducing data using a nonlinear accessible recording medium.

Furthermore, the present invention is, of course, not limited to the above embodiments and can take various other configurations without departing from the gist of the present invention.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A data recording and reproducing apparatus comprising:
   a plurality of RAID for recording and/or reproducing data containing video and/or audio data, each RAID having a plurality of HDD and a LAN interface;
   an error-correcting RAID for recording and reproducing an error-correcting code, having a plurality of HDD and said LAN interface; and
   a plurality of input and output processing means connected to said plurality of RAID and said error-correcting RAID through said LAN for processing said data inputted from the outside to output processed data to said RAID in a time-division manner and which process said data outputted from said RAID in a time-division manner to output processed data to the outside,
   wherein said plurality of input and output processing means further includes:
   input processing means for dividing said data inputted from the outside to transfer divided data to said RAID, for generating an error-correcting code of said data, and for transferring said error-correcting code to said error-correcting RAID; and
   output processing means for correcting erroneous data by using said error-correcting code outputted from said error-correcting RAID, and for outputting error-corrected data to the outside if an error is detected from said data outputted from said RAID,
   wherein said error is detected based on status data, which includes a status of said data and said error-correcting code, that is returned from said RAID to one of the plurality of input and output processing means, and is then added to an error table that includes information regarding an error in the recording and/or reproducing of said data and error-correcting code,
   wherein an error is corrected and data is restored by transferring reproduction request commands from the input processing means to each of the RAIDs other than the RAID that has the error, and then using data blocks and parity data that is transferred to the input processing means after being produced each of the RAIDs other that the RAID that has the error to make restored data, and then transferring the restored data from the input processing means to the RAID that has the error.

2. A data recording and reproducing apparatus according to claim 1,
   wherein said input and output processing means include recording data restoring means for restoring data or an error-correcting code, for requesting said data or said error correcting code from a second RAID, and outputting said restored data or said error-correcting code to said RAID after a trouble in which said data or said error-correcting code cannot be recorded on said RAID had been removed.

3. A data recording and reproducing apparatus according to claim 1, wherein said LAN interface is ethernet.

4. A data recording and reproducing apparatus according to claim 1, wherein said LAN interface is an IEEE 1394 transmission line.

5. A data recording and reproducing apparatus according to claim 1, wherein said LAN interface is a fibre channel.

6. A data recording and reproducing method comprising the steps of:
   processing data containing video and/or audio data inputted from the outside to output processed data to a plurality of RAID in a time-division manner, each RAID having a plurality of HDD and a LAN interface;
   recording and reproducing an error-correcting code on an error-correcting RAID;
   outputting said reproduced data from said RAIDs in a time-division manner; and
   processing said outputted data and outputting said processed data to the outside comprising the steps of:
   a first step of dividing and outputting said data inputted from the outside to said plurality of RAID from a plurality of input and output processing means connected to said RAID by the network interface, generating an error-correcting code of said data and outputting said error-correcting code;
   a second step of recording said divided data on said recording medium by a first of said plurality of RAID and recording said error-correcting code on said recording medium by said error-correcting RAID;
   a third step of reproducing said data from said recording medium by the first of said plurality of RAID, reproducing said error-correcting code from said recording medium by said error-correcting RAID and outputting said reproduced data and said reproduced error-correcting code in a time-division manner through the LAN interface; and
   a fourth step of correcting erroneous data by using said error-correcting code outputted from said error correcting RAID and outputting said error-corrected data to the outside if an error is detected from said data outputted from said error correcting RAID,
   wherein said error is detected based on status data, which includes a status of said data and said error correcting code, that is returned from said RAID to one of a plurality of the input and output processing means;

a fifth step of generating an error table that includes information regarding an error in the recording and/or reproducing of said data and said error correcting code, wherein an error is corrected and data is restored by transferring reproduction request commands from the input processing means to each of the RAIDs other than the RAID that has the error, and then using data blocks and parity data that is transferred to the input processing means after being produced each of the RAIDs other that the RAID that has the error to make restored data, and then transferring the restored data from the input processing means to the RAID that has the error.

7. A data recording and reproducing method according to claim 6, wherein said first step further includes a data restoring step of restoring said data or said error-correcting code, for requesting said data or said error correcting code from a RAID, and outputting said restored data or said restored error-correcting code to said RAID after a trouble in which said data or said error-correcting code cannot be recorded on said RAID had been removed.

8. A data recording and reproducing method according to claim 6, wherein said LAN interface line is ethernet.

9. A data recording and reproducing method according to claim 6, wherein said LAN interface is an IEEE 1394 transmission line.

10. A data recording and reproducing method according to claim 6, wherein said LAN interface is a fibre channel.

* * * * *